United States Patent Office 3,202,706
Patented Aug. 24, 1965

3,202,706
FLUORINATED ORGANIC ACIDS
Murray Hauptschein, Glenside, and Robert E. Oesterling, Flourtown, Pa., assignors to Pennsalt Chemicals Corporation, Philadelphia, Pa., a corporation of Pennsylvania
No Drawing. Filed Aug. 4, 1961, Ser. No. 129,239
9 Claims. (Cl. 260—535)

This invention relates to new fluorinated α-hydroxy carboxylic acids.

The new compounds of the invention are those of the general formula $RCF_2CH(OH)COOH$, and their metal salts and ammonium salts. In the above formula, R may be fluorine, or a perfluoroalkyl, a perfluorohydroalkyl, a perfluorochloroalkyl or a perfluorochlorohydroalkyl radical. As used herein, perfluoro means a radical containing only fluorine and carbon. Perfluorohydro means a radical containing only carbon, fluorine and hydrogen in which the molar ratio of fluorine:hydrogen is at least 1:1. A perfluorochloro radical means one containing only carbon, fluorine and chlorine in which the molar ratio of fluorine:chlorine is at least 1:1. A perfluorochlorohydro radical means one containing only carbon, fluorine, chlorine and hydrogen in which the molar ratio of fluorine to chlorine plus hydrogen is at least 1:1. Where R is a fluorinated alkyl as defined above, it may contain from 1 to 20 carbon atoms and preferably from 2 to 12 carbon atoms.

A particularly preferred class of the fluorinated α-hydroxy acids of the invention are those in which R is a perfluoro radical having from about 2 to 12 carbon atoms. Another particularly preferred class are those of the formula $R'[CH_2CF_2]_nCH(OH)COOH$ where R' is a perfluoroalkyl or a perfluorochloroalkyl radical and where $n$ is an integer having a value of about one to eight. As explained hereinafter, this latter class of α-hydroxy acids may be prepared from telomers of vinylidene fluoride.

The new fluorinated α-hydroxy acids of the invention may be prepared by the reaction of terminal olefins of the formula $RCH=CF_2$, where R is as defined above, with dinitrogen tetroxide ($N_2O_4$) at moderately elevated temperatures of from 50 to 150° C. and preferably from 80 to 130° C. The product of this reaction is then hydrolyzed in water or a mildly alkaline aqueous medium to provide the α-hydroxy acid $RCH(OH)COOH$. Although the invention does not depend upon any particular reaction mechanism, it is probable that the reaction of the olefin with $N_2O_4$ and subsequent hydrolysis proceeds in accordance with the following:

(a) 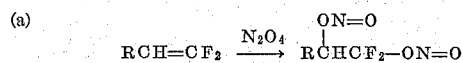

(b) 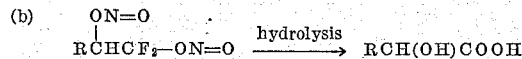

According to the above, two nitrite groups add across the double bond to give the dinitrite of Equation a. Upon hydrolyis, the nitrite group attached to the hydrogen containing carbon is hydrolyzed to hydroxyl, while the nitrite group attached to the fluorinated carbon also hydrolyzes to hydroxyl to form the unstable difluoroalcohol $RCH(OH)CF_2OH$ which in turn splits out hydrogen fluoride to form the acyl fluoride

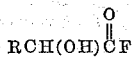

which finally hydrolyzes in the aqueous media to form the carboxylic acid $RCH(OH)COOH$ (or a salt thereof in the presence of base. [The dinitrate, rather than the dinitrite as shown in Equations a and b may be the intermediate product in whole or in part due to the oxidizing conditions of the reaction. The dinitrate would hydrolyze in the same manner.]

In the above procedure, a second reaction occurs concurrently with that forming the hydroxy acid producing a nitro alcohol as a second major product. This second reaction probably occurs through the formation of a nitro-nitrite addition product which upon hydrolysis yields an α-hydroxy nitro compound according to the following:

(c) 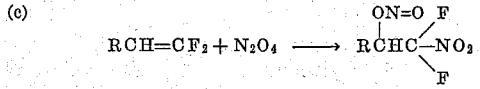

(d) 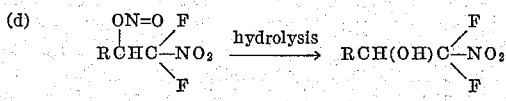

The fluorinated nitro alcohols produced by such reactions are believed to be novel compounds and are the subject of the copending application of Murray Hauptschein and Robert E. Oesterling, Serial No. 128,646, filed August 2, 1961.

Since the reaction temperatures are well above the boiling point of $N_2O_4$ (about 20° C.), the reaction will take place at moderate superatmospheric pressures corresponding to the autogenous pressures of the reactant at the reaction temperatures, generally ranging from 50 to 500 lbs./in.² Reaction time is not critical. Generally, reaction periods are from 1 to 50 hours and preferably from 5 to 20 hours are satisfactory. The molar ratios of the reactants are not critical, but it is preferred to use a molar excess of $N_2O_4$ to insure good conversions of the olefin to the addition product. Molar ratios of $N_2O_4$:olefin of from 1.1:1 to 1.5:1 are generally preferable.

The reaction is desirably carried out in the presence of a solvent which is unreactive to $N_2O_4$ under the reaction conditions. Without a solvent, the addition reaction is difficult to control, yields are lower, and explosion may occur. Preferred are the halogenated solvents, particularly the chlorinated or chlorofluorinated solvents such as chloroform, methylene chloride $CH_2Cl_2$, carbon tetrachloride, trichlorotrifluoroethane, dichlorotetrafluoroethane etc. The amount of solvent is not critical and generally may be used in an amount ranging from 100 to 1000 milliliters per mole of olefin. Desirably, the reaction is carried out under substantially anhydrous conditions to avoid reactions between $N_2O_4$ and water and the possibility of other side reactions.

As is well known dinitrogen tetroxide ($N_2O_4$) is probably an equilibrium mixture of $N_2O_4$ with various other forms of nitrogen oxides particularly $NO_2$ whose composition changes depending principally upon temperature. This behavior of $N_2O_4$ is described for example, by J. L. Rebsomer in Chemical Reviews, vol. 36, No. 2, April 1945, pages 157 et seq. As used herein, the term "dinitrogen tetroxide" ($N_2O_4$) is intended to include the various equilibrium mixtures that are obtained under the reaction conditions specified herein.

Recovery of the hydroxy acid following hydrolysis, and separation from the nitro alcohols concurrently produced, is conveniently effected by performing the hydrolysis in an aqueous alkaline media or by neutralizing the aqueous mixture following hydrolysis with a relatively mild base such as sodium carbonate or sodium bicarbonate. Upon neutralization, the nitro alcohols will generally separate as an insoluble organic layer, with the hydroxy acids contained principally in the aqueous layer in the salt form. The acid itself may be recovered from the aqueous layer by acidification e.g. with HCl followed if necessary by extraction with an organic solvent such as diethyl ether.

Many of the precursor olefins RCH=CF₂ are novel compounds. These may be prepared by the reaction of an iodide RI, where R is as defined above with vinylidene fluoride in accordance with the following:

(e) $$RI + CH_2=CF_2 \rightarrow R[CH_2CF_2]_nI$$

where $n$ is an integer. Telomerization reactions of this type are described by Hauptschein et al. [JACS, vol. 80, pages 846 to 851] and in U.S. Patent 2,975,220 of Hauptschein et al. As described more in detail in these references, the reaction of the iodide with vinylidene fluoride is preferably carried out at elevated temperatures in the range of from about 20° to 250° C. and at elevated pressures. By using an excess of telogen RI, the reaction may be controlled to give yields of the 1:1 adduct of iodide to olefin, i.e. compounds of the type RCH₂CF₂I.

The iodides thus produced may then be dehydroiodinated by reaction with an ionic halide, e.g. lithium chloride, in a polar solvent, e.g. dimethylformamide. Such procedures are described in detail in the copending application of Murray Hauptschein et al., Serial No. 53,878 now Patent No. 3,116,337, filed September 6, 1960. Where the precursor iodide contains one vinylidene fluoride unit, olefins of the formula RCH=CF₂ are obtained. Where the precursor iodide contains two or more repeating vinylidene fluoride units, the olefins produced by dehydroiodination will have the formula $$R[CH_2CF_2]_{n-1}CH=CF_2$$

Typical examples of precursor olefins and the α-hydroxy acids that are obtained therefrom in accordance with the invention are the following:

| Precursor Olefin | α-hydroxy acid |
|---|---|
| CF₃CH=CF₂ | CF₃CH(OH)COOH |
| CF₃CH₂CF₂CH=CF₂ | CF₃CH₂CF₂CH(OH)COOH |
| CF₃CF₂CF₂CH=CF₂ | CF₃CF₂CF₂CH(OH)COOH |
| CF₃CF₂CF₂CH₂CF₂CH=CF₂ | CF₃CF₂CF₂CH₂CF₂CH(OH)COOH |
| C₃F₇[CH₂CF₂]₃CH=CF₂ | C₃F₇[CH₂CF₂]₃CH(OH)COOH |
| CF₃ĊFCH=CF₂ (with CF₃ branch) | CF₃ĊFCH(OH)COOH (with CF₃ branch) |
| C₂F₅ĊFCH=CF₂ (with CF₃ branch) | C₂F₅ĊFCH(OH)COOH (with CF₃ branch) |
| CF₃ĊFCH=CF₂ (with CF₂Cl branch) | CF₃ĊFCH(OH)COOH (with CF₂Cl branch) |
| CF₂ClCFClCH=CF₂ | CF₂ClCFClCH(OH)COOH |
| CF₃ĊF[CF₂CF₂]₂CH=CF₂ (with CF₂Cl branch) | CF₃ĊF[CF₂CF₂]₂CH(OH)COOH (with CF₂Cl branch) |

The α-hydroxy acids of the invention may be readily converted by conventional procedures into their metal salts and their ammonium salts. Thus, the alkali metal salts such as sodium, potassium, lithium etc., and other salts such as the calcium, magnesium, copper, iron, aluminum, chromium etc. salts may be produced by reacting the acid with the corresponding carbonate of the metal. The ammonium salts may be prepared readily by bubbling gaseous ammonia through a solution of the acid in a solvent such as diethyl ether or a fluorinated solvent such as CFCl₂CF₂Cl. The insoluble ammonium salt precipitates and is recovered by filtering off the salt or removal of the solvent by evaporation to dryness.

The following examples illustrate several specific embodiments of the invention:

EXAMPLE 1

The precursor olefin CF₃CF₂CF₂CH=CF₂ is prepared by the dehydroiodination of the iodide

CF₃CF₂CF₂CH₂CF₂I according to the procedures described in the above mentioned copending application Serial No. 53,878. A 46.4 gram (0.2 mole) portion of the olefin is added to 100 milliliters of CFCl₂CF₂Cl and the resulting solution cooled to 0° C. Into this solution there is condensed 27.6 grams (0.3 mole) of dinitrogen tetroxide (N₂O₄) and the mixture is then dried over P₂O₅ at 0° C. for two or three hours. The solution is then filtered into a 300 milliliter stainless steel autoclave chilled to −10° C. which is then sealed and heated at 100° C. for 16 hours with agitation. The autoclave is then cooled in an ice bath and the contents transferred to a 200 milliliter Vigreaux still. The excess dinitrogen tetroxide and chlorofluorinated solvent are distilled from the mixture leaving 40 grams of a yellow oil.

This product is then stirred with 200 milliliters of water at room temperature and sodium carbonate is then added to the mixture until it is slightly on the alkaline side. The mixture is then allowed to separate into a water layer and a water insoluble layer consisting of a pale yellow oil. The alkaline aqueous layer is then extracted twice with 40 milliliter portions of diethyl ether after which it is acidified by the addition of dilute hydrochloric acid. The acidified water layer is then extracted three times with 40 milliliter portions of diethyl ether. The ether extract is dried over anhydrous magnesium sulfate and evaporated giving 10 grams (20% yield) of a pale yellow oil which cystallizes on standing over night. Recrystallization from a benzene-light petroleum ether solvent gives colorless needles of the pure hydroxy acid CF₃CF₂CF₂CH(OH)COOH having a melting point of 108 to 109° C. boiling point 70° C. at 27 mm. Hg. The infrared spectrum of this compound is characteristic of hydroxy acid absorption and consistent with the above structure. This compound is a strong acid.

The non-aqueous layer which separates after hydrolysis and addition of the sodium carbonate is the nitro alcohol CF₃CF₂CF₂CH(OH)CF₂NO₂ having a boiling point of 52° C. at 44 mm. Hg and having a refractive index $n_D^{25}$ 1.3240. This nitro alcohol is obtained in about 40% yield.

Example 2

The precursor olefin CF₃CF₂CF₂CH₂CF₂CH=CF₂ is prepared by the dehydroiodination of

CF₃CF₂CF₂CH₂CF₂CH₂CF₂I as described in the above mentioned copending application, Serial No. 53,878. A 50 gram portion (0.17 mole) of the olefin and 23 grams of N₂O₄ are dissolved in 100 milliliters of CF₂ClCFCl₂ according to the procedures described in Example 1. The mixture is placed in a 300 milliliter stainless steel autoclave which is sealed and then heated at 100° C. for 15 hours. The autoclave is then cooled to room temperature, vented, and the liquid contents poured into a Vigraux still where the excess N₂O₄ and the chlorofluorinated solvent is distilled off leaving 16 grams of a liquid product (92% yield).

The crude product is added to 200 milliliters of water, stirred and then the mixture made slightly alkaline by the addition of sodium bicarbonate. The mixture separates into an insoluble oil layer and an aqueous alkaline layer. The aqueous alkaline layer is first extracted three times with diethyl ether and the ether extract added to the oil layer. The aqueous alkaline layer is then acidified with dilute hydrochloric acid and again extracted with diethyl ether. The ether extract is evaporated to give 10 grams (19% yield) of a base-soluble yellow oil which crystallizes on standing, this being the α-hydroxy acid $$CF_3CF_2CF_2CH_2CF_2CH(OH)COOH$$

Recrystallization of this product from a benzene light petroleum ether solvent gives colorless needles, having a melting point of 82 to 83° C.

*Analysis.*—Calculated for: $C_7H_5F_9O_3$: C, 27.28; H, 1.63. Found: 27.00; H, 1.69. The infrared spectrum of this compound shows typical (OH) absorption at 2.88μ and carbonyl absorption at 5.8μ. The compound is strongly acidic and is an excellent surfactant in aqueous media as the free acid or in the form of its salts.

The water insoluble oil layer which separates during hydrolysis is dried and then evaporated to give 35 grams (59% yield) of a water-insoluble oil consisting of the nitro alcohol $CF_3CF_2CF_2CH_2CF_2CH(OH)CF_2NO_2$ having a boiling point of 72° C. at 4 mm. Hg and a refractive index $n_D^{25}$ 1.3347.

*Example 3*

The precursor olefin $CF_3CH=CF_2$ in this sample is prepared by the dehydroiodination of $CF_3CH_2CF_2I$ according to the procedures described in the aforementioned copending application, Serial No. 53,878. A solution of 27.6 grams (0.3 mole) of dinitrogen tetroxide in 100 milliliters of $CF_2ClCFCl_2$ is placed in a 300 milliliter stainless steel autoclave after which 26.4 grams (0.2 mole) of $CF_3CH=CF_2$ is added by vacuum transfer. The autoclave is then heated at 90 to 100° C. for 17 hours while shaking. The autoclave is cooled to room temperature and upon venting, 2.5 grams of unreacted olefin is collected. The liquid product from the autoclave is poured into 100 milliliters of water which is stirred and then made slightly alkaline by the addition of sodium bicarbonate.

The mixture separates into an oily water insoluble layer and an aqueous alkaline layer. The aqueous alkaline layer is extracted three times with diethyl ether after which it is acidified with aqueous HCl and then reextracted three times with additional diethyl ether. The ether extract from this second extraction is dried over andydrous magnesium sulfate and then evaporated to give 15 grams of a base soluble oil consisting mainly of a hydrated form of the acid $CF_3CH(OH)COOH$, i.e. trifluoromethyl glycolic acid. Upon vacuum redistillation, this compound is found to have a boiling point of 57° C. at 123 mm. Hg.

*Analysis.*—Found: Fluorine 36.15; Neutralization equivalent 154. The infrared spectrum of this compound (liquid film) has the following peaks: 3μ(OH), 5.6–5.85μ (C=O), 6.25μ, 8.2μ, 8.6μ, 12.45μ, 12.8μ, 14.2μ.

The water insoluble layer which separates upon hydrolysis, after drying and evaporation of the $CF_2ClCFCl_2$ solvent is the constant boiling etherate of the nitro alcohol $CF_3CH(OH)CF_2NO_2$ having the formula $$[CF_3CH(OH)CF_2NO_2]_3 \cdot C_2H_5OC_2H_5$$

boiling at 70° C. at 100 mm. Hg.

*Example 4*

The precursor of olefin $CF_3CH_2CF_2CH=CF_2$ in this example is prepared by the dehydroiodination of the iodide $$CF_3CH_2CF_2CH_2CF_2I$$

according to the procedures described in the above mentioned copending application, Serial No. 53,878. A 49 gram (0.25 mole) portion of the olefin and 32 grams (0.35 mole) of $N_2O_4$ are dissolved in 150 milliliters of $CF_2ClCFCl_2$ and the mixture dried over $P_2O_5$ and then filtered into a 300 milliliter stainless steel autoclave. The autoclave is sealed and heated with shaking 100° C. for 5 hours at a pressure of 125 lbs./in.² gage. The autoclave is then cooled and vented and the liquid content poured into water, stirred, after which sodium bicarbonate is added until the solution is mildly alkaline.

A water insoluble oil layer separates from an aqueous alkaline layer. The aqueous alkaline layer is made acid by the addition of dilute hydrochloric acid and extracted with diethyl ether. After drying the ether extract over anhydrous magnesium sulfate and evaporation of the ether, the hydroxy acid $CF_3CH_2CF_2CH(OH)COOH$ is obtained.

The water insoluble oil layer separating upon hydrolysis is dried and after evaporation of the chlorofluorinated solvent there is obtained 21 grams of a yellow oil consisting of a nitro alcohol $CF_3CH_2CF_2CH(OH)CF_2NO_2$ having a boiling point of 66° C. at 6 mm. Hg and a refractive index $n_D^{27}$ 1.3478.

*Example 5*

The precursor olefin

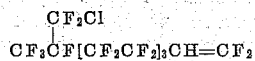

is prepared by the dehydroiodination of

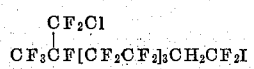

according to the procedures described in the aforementioned application Serial No. 53,878. Following the procedure described in Example 1, the olefin is reacted with a slight excess of $N_2O_4$ in a sealed autoclave in $$CF_2ClCFCl_2$$

as a solvent at a temperature of 100° C. for 20 hours. The liquid contents of the autoclave are stirred in water; sodium bicarbonate is added until the mixture is slightly alkaline. The mixture separates into a water insoluble layer and an aqueous alkaline layer. The aqueous alkaline is acidified with dilute aqueous HCl, whereupon a water insoluble oil separates. The acidified aqueous layer is extracted with $CF_2ClCFCl_2$ and the extract is added to the separated oil after which the mixture is evaporated to give the alpha hydroxy acid

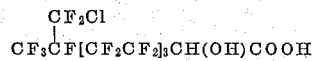

a relatively strong acid having excellent surfactant properties in aqueous media.

*Example 6*

The precursor olefin

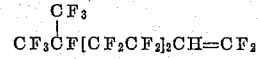

is prepared by the dehydroiodination of

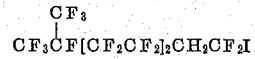

by the procedure described in the above mentioned application Serial No. 53,878. The olefin is reacted with a slight excess of $N_2O_4$ in a sealed autoclave at 100° C. for 24 hours after which the liquid product is hydrolyzed in water and neutralized.

The aqueous alkaline layer obtained following neutralization is acidified and then extracted with $CF_2ClCFCl_2$. Upon evaporation of the extract the acid

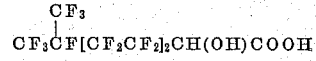

is obtained, a relatively strong acid having excellent surfactant properties in aqueous media.

Example 7

The ammonium salt of the hydroxy acid of Example 1 $CF_3CF_2CF_2CH(OH)COOH$ is prepared by dissolving the acid in a large excess of $CF_2ClCFCl_2$. Gaseous ammonia is bubbled through the solution at room temperature until precipitation is complete. The $CF_2ClCFCl_2$ solvent is removed by evaporation under vacuum to provide the ammonium salt $CF_3CF_2CF_2CH(OH)COONH_4$, a white crystalline solid.

Example 8

The sodium salt of the hydroxy acid of Example 2 $CF_3CF_2CF_2CH_2CF_2CH(OH)COOH$ is obtained by adding sodium bicarbonate to the acid dissolved in an excess of diethyl ester. The salt $$CF_3CF_2CF_2CH_2CF_2CH(OH)COONa$$

a white crystalline solid, precipitates and is recovered by evaporation of the ether to dryness.

The α-hydroxy acids of the invention are characterized by their chemical stability. In contrast to the hydrocarbon analogs which dehydrate readily to form the corresponding acrylic acids, the α-hydroxy acids of the invention are not subject to this type of dehydration. They are considerably stronger acids than their corresponding hydrocarbon analogs. They have excellent surface active properties, particularly when containing 5 or more carbon atoms.

The compounds of the invention, as the free acid, or in the form of their salts, are useful as surfactants in aqueous media, particularly where the combination of good chemical stability and high surfactant activity is desired. In this respect, the compound of the invention $$RCF_2CH(OH)COOH$$

and their salts where R is a perfluoroalkyl radical having from 2 to 12 carbon atoms are particularly valuable class because of the unusual surface properties conferred by the relatively long chain perfluoroalkyl group.

The compounds of the invention are also useful as chelating or sequestering agents, particularly in environments, such as strong oxidizing environments, where less stable materials such as the hydrocarbon α-hydroxy acids, would be subject to a chemical attack and decomposition.

We claim:
1. Compounds selected from the class consisting of fluorinated α-hydroxy acids of the formula

$$RCF_2CH(OH)COOH$$

and salts thereof selected from the class consisting of the alkali metal, calcium, magnesium, copper, iron, aluminum, chromium and ammonium salts, where R is a radical having from 1 to 20 carbon atoms selected from the class consisting of fluorine and perfluoroalkyl, perfluorohydroalkyl, perfluorochloroalkyl and perfluorochlorohydroalkyl radicals.

2. Compounds in accordance with claim 1 in which R is a perfluoroalkyl radical having 2 to 12 carbon atoms.

3. Compounds in accordance with claim 1 in which R is perfluorohydroalkyl radical having from 2 to 12 carbon atoms.

4. Compounds in accordance with claim 1 in which R is a perfluorochloroalkyl radical.

5. The fluorinated α-hydroxy acids of the formula $$R'[CH_2CF_2]_nCH(OH)COOH$$

where $n$ is an integer from 1 to 8 and where R' is a perfluoroalkyl radical having from 2 to 12 carbon atoms.

6. The fluorinated α-hydroxy acid of the formula $$C_3F_7CH(OH)COOH$$

7. The fluorinated α-hydroxy acid of the formula $$C_3F_7CH_2CF_2CH(OH)COOH$$

8. The fluorinated α-hydroxy acid of the formula $$CF_3CH(OH)COOH$$

9. The fluorinated α-hydroxy acid of the formula $$CF_3CH_2CF_2CH(OH)COOH$$

References Cited by the Examiner

Chemical Abstracts, vol. 53, Formula Index, page 46F (1959).
Grechishkin: Zhut. Eksptl. i. Teoret. Fiz., vol. 35, pages 364–6 (1958).
Simons: Fluorine Chemistry, vol. I, pages 483–5 (1950).
Simons: Fluorine Chemistry, vol. II, page 393 (1950).

LORRAINE A. WEINBERGER, *Primary Examiner.*
LEON ZITVER, *Examiner.*

UNITED STATES PATENT OFFICE
CERTIFICATE OF CORRECTION

Patent No. 3,202,706                                August 24, 1965

Murray Hauptschein et al.

It is hereby certified that error appears in the above numbered patent requiring correction and that the said Letters Patent should read as corrected below.

Column 8, lines 8 to 12, strike out "a radical having from 1 to 20 carbon atoms selected from the class consisting of fluorine and perfluoroalkyl, perfluorohydroalkyl, perfluorochloroalkyl and perfluorochlorohydroalkyl radicals." and insert instead -- selected from the class consisting of fluorine and perfluoroalkyl, perfluorohydroalkyl, perfluorochloroalkyl and perfluorochlorohydroalkyl radicals having from 1 to 20 carbon atoms. --.

Signed and sealed this 24th day of May 1966.

(SEAL)

Attest:

ERNEST W. SWIDER                                              EDWARD J. BRENNER

Attesting Officer                                                   Commissioner of Patents